US012627793B2

(12) United States Patent
Choi et al.

(10) Patent No.: US 12,627,793 B2
(45) Date of Patent: May 12, 2026

(54) IMAGE ENCODING/DECODING METHOD, METHOD OF TRANSMITTING BITSTREAM, AND RECORDING MEDIUM IN WHICH BITSTREAM IS STORED

(71) Applicant: LG Electronics Inc., Seoul (KR)

(72) Inventors: Jangwon Choi, Seoul (KR); Hyeong Moon Jang, Seoul (KR); Sunmi Yoo, Seoul (KR); Jungah Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/723,772

(22) PCT Filed: Jan. 2, 2023

(86) PCT No.: PCT/KR2023/000045
§ 371 (c)(1),
(2) Date: Jun. 24, 2024

(87) PCT Pub. No.: WO2023/132590
PCT Pub. Date: Jul. 13, 2023

(65) Prior Publication Data
US 2024/0406387 A1 Dec. 5, 2024

(30) Foreign Application Priority Data
Jan. 4, 2022 (KR) ........................ 10-2022-0000907

(51) Int. Cl.
*H04N 19/11* (2014.01)
*H04N 19/159* (2014.01)
(Continued)

(52) U.S. Cl.
CPC ........... *H04N 19/11* (2014.11); *H04N 19/159* (2014.11); *H04N 19/176* (2014.11); *H04N 19/186* (2014.11); *H04N 19/593* (2014.11)

(58) Field of Classification Search
CPC .. H04N 19/593; H04N 19/186; H04N 19/184; H04N 19/11; H04N 19/159; H04N 19/176; H04N 19/70
See application file for complete search history.

(56) References Cited

U.S. PATENT DOCUMENTS 11,870,980 B2 * 1/2024 Zhang .................... H04N 19/52
2022/0224891 A1 * 7/2022 Chiang ................ H04N 19/176
(Continued)

FOREIGN PATENT DOCUMENTS

KR 10-2017-0069328 6/2017
KR 10-2018-0075422 7/2018
(Continued)

OTHER PUBLICATIONS

International Search Report and Written Opinion in International Appln. No. PCT/KR2023/000045, mailed on Apr. 5, 2023, 9 pages (with partial English translation).
(Continued)

*Primary Examiner* — Tsion B Owens
(74) *Attorney, Agent, or Firm* — Fish & Richardson P.C.

(57) ABSTRACT

An image encoding/decoding method, a bitstream transmission method, and a computer-readable recording medium for storing a bitstream are provided. The image decoding method according to the present disclosure is an image decoding method performed by an image decoding device, and may comprise the steps of: deriving multiple direct mode (DM) candidates for a chroma block; determining one DM candidate among the multiple DM candidates on basis of first information; and performing intra prediction of the chroma block on the basis of the determined DM candidate, wherein default modes for the chroma block are modified on the basis of whether same are identical to the multiple DM candidates.

13 Claims, 12 Drawing Sheets

(51) Int. Cl.

| | |
|---|---|
| *H04N 19/176* | (2014.01) |
| *H04N 19/186* | (2014.01) |
| *H04N 19/593* | (2014.01) |

(56) References Cited

U.S. PATENT DOCUMENTS

| | | | | |
|---|---|---|---|---|
| 2022/0279189 | A1* | 9/2022 | Jang | H04N 19/96 |
| 2024/0098274 | A1* | 3/2024 | Huo | H04N 19/159 |
| 2025/0159132 | A1* | 5/2025 | Jun | H04N 19/593 |
| 2025/0193441 | A1* | 6/2025 | Kim | H04N 19/176 |

FOREIGN PATENT DOCUMENTS

| | | | | | |
|---|---|---|---|---|---|
| KR | 20180075422 | A | * | 7/2018 | H04N 19/70 |
| KR | 10-2021-0018137 | | | 2/2021 | |
| KR | 10-2021-0108389 | | | 9/2021 | |
| KR | 10-2021-0116676 | | | 9/2021 | |
| KR | 20210108389 | A | * | 9/2021 | H04N 19/11 |
| WO | 2018/035130 | A1 | | 2/2018 | |
| WO | 2018/064956 | A1 | | 4/2018 | |
| WO | WO-2018124686 | A1 | * | 7/2018 | H04N 19/593 |
| WO | WO-2020185047 | A1 | * | 9/2020 | H04N 19/96 |
| WO | WO-2023132590 | A1 | * | 7/2023 | H04N 15/593 |

OTHER PUBLICATIONS

Extended European Search Report in European Appln. No. 23737338. 6, mailed on Nov. 14, 2025, 13 pages.

Rath et al., "CE3-related: DM-dependent chroma intra prediction modes," JVET-M0100, Joint Video Experts Team (JVET) of ITU-T SG 16 WP 3 and ISO/IEC JTC 1/SC 29/WG 11, 13th Meeting: Marrakech, Morocco, Jan. 9-18, 2019, 5 pages.

Zhang et al., "EE5: Multiple Direct Modes for chroma intra coding," JVET-E0062, Joint Video Exploration Team (JVET) of ITU-T SG 16 WP 3 and ISO/IEC JTC 1/SC 29/WG 11, 5th Meeting: Geneva, Switzerland, Jan. 12-20, 2017, 3 pages.

Zhang et al., "Multiple Direct Mode for Intra Coding," Paper, Presented at the IEEE Visual Communications and Image Processing (VCIP), St. Petersburg, Florida, Dec. 10-13, 2017, 4 pages.

* cited by examiner luma block             chroma block

IMAGE ENCODING/DECODING METHOD, METHOD OF TRANSMITTING BITSTREAM, AND RECORDING MEDIUM IN WHICH BITSTREAM IS STORED

CROSS-REFERENCE TO RELATED APPLICATIONS

This application is a National Stage application under 35 U.S.C. § 371 of International Application No. PCT/KR2023/000045, filed on Jan. 2, 2023, which claims the benefit of Korean Patent Application No. 10-2022-0000907, filed on Jan. 4, 2022. The disclosures of the prior applications are incorporated by reference in their entirety.

TECHNICAL FIELD

The present disclosure relates to an image encoding/decoding method, a method of transmitting a bitstream, and a recording medium storing the bitstream, and relates to chroma intra prediction using a plurality of direct modes.

BACKGROUND

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

Another object of the present disclosure is to provide a method of deriving a plurality of direct modes.

Another object of the present disclosure is to provide a method capable of using both default modes and a plurality of direct modes as a chroma intra prediction mode.

Another object of the present disclosure is to provide a method of encoding direct modes.

Another object of the present disclosure is to provide a method of eliminating overlap between default modes and a plurality of direct modes.

Another object of the present disclosure is to provide a non-transitory computer-readable recording medium storing a bitstream generated by an image encoding method according to the present disclosure.

Another object of the present disclosure is to provide a non-transitory computer-readable recording medium storing a bitstream received, decoded and used to reconstruct an image by an image decoding apparatus according to the present disclosure.

Another object of the present disclosure is to provide a method of transmitting a bitstream generated by an image encoding apparatus according to the present disclosure.

The technical problems solved by the present disclosure are not limited to the above technical problems and other technical problems which are not described herein will become apparent to those skilled in the art from the following description.

An image decoding method according to an aspect of the present disclosure is performed by an image decoding apparatus. The image decoding method may comprise deriving a plurality of direct mode (DM) candidates for a chroma block, determining any one mode of default modes and the plurality of DM candidates for the chroma block based on first information, and intra-predicting the chroma block based on the determined mode. The default modes may be modified based on whether the default modes are the same as the plurality of DM candidates.

An image encoding method according to another aspect of the present disclosure is performed by an image encoding apparatus. The image encoding method may comprise deriving a plurality of direct mode (DM) candidates for a chroma block, determining any one mode of default modes and the plurality of DM candidates for the chroma block, and intra-predicting the chroma block based on the determined mode. The default modes may be modified based on whether the default modes are the same as the plurality of DM candidates, and first information indicating the determined mode may be encoded in a bitstream.

A computer-readable recording medium according to another aspect of the present disclosure can store a bitstream generated by the image encoding method or apparatus of the present disclosure.

A transmission method according to another aspect of the present disclosure may transmit a bitstream generated by the image encoding method or apparatus of the present disclosure.

The features briefly summarized above with respect to the present disclosure are merely exemplary aspects of the detailed description below of the present disclosure, and do not limit the scope of the present disclosure.

According to the present disclosure, it is possible to provide an image encoding/decoding method and apparatus with improved encoding/decoding efficiency.

Additionally, according to the present disclosure, the performance of chroma intra prediction can be improved by more precisely deriving a plurality of direct modes.

Additionally, according to the present disclosure, a plurality of direct modes can be derived while maintaining default modes corresponding to essential modes as chroma intra prediction modes.

Additionally, according to the present disclosure, the problem of overlap between the default modes and the plurality of direct modes can be solved by replacing the default mode that overlaps the plurality of direct modes with another mode.

It will be appreciated by persons skilled in the art that that the effects that can be achieved through the present disclosure are not limited to what has been particularly described hereinabove and other advantages of the present disclosure will be more clearly understood from the detailed description.

FIG. is a diagram to explain various positions where a direct mode may be derived.

Figure 9:
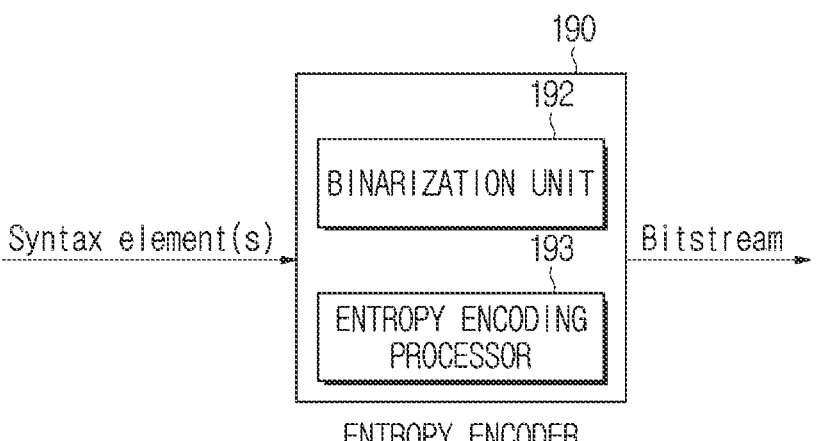

FIG. 9 is a diagram schematically showing an entropy encoding unit of an image encoding apparatus.

Figure 10:
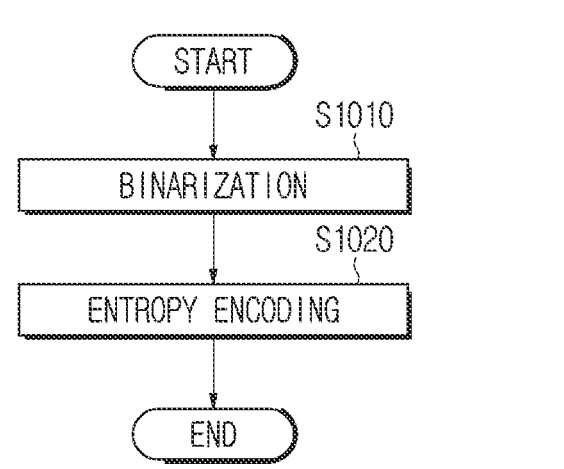

FIG. 10 is a flowchart showing an entropy encoding method.

Figure 11:
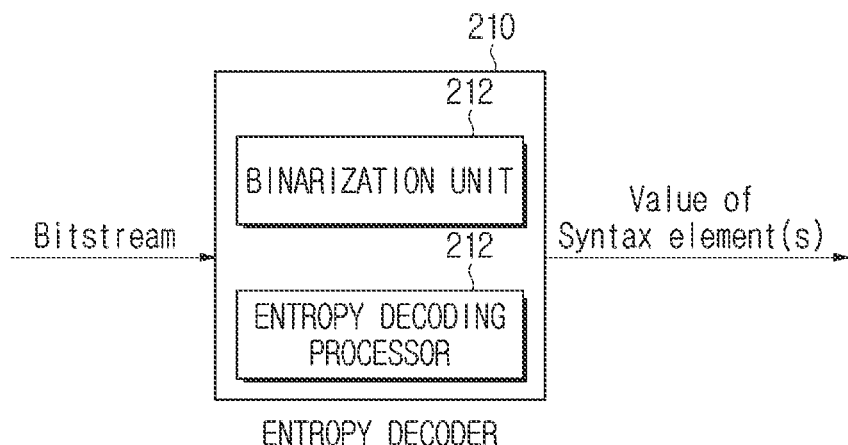

FIG. 11 is a diagram schematically showing an entropy decoder of an image decoding apparatus.

Figure 12:
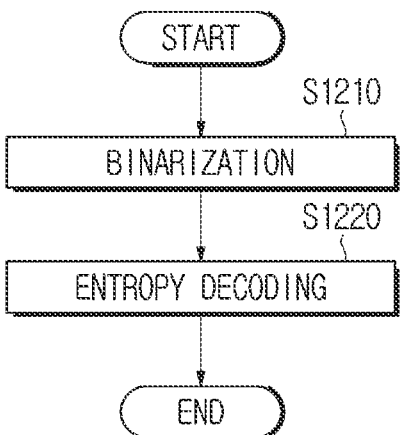

FIG. 12 is a flowchart showing an entropy decoding method.

Figure 13:
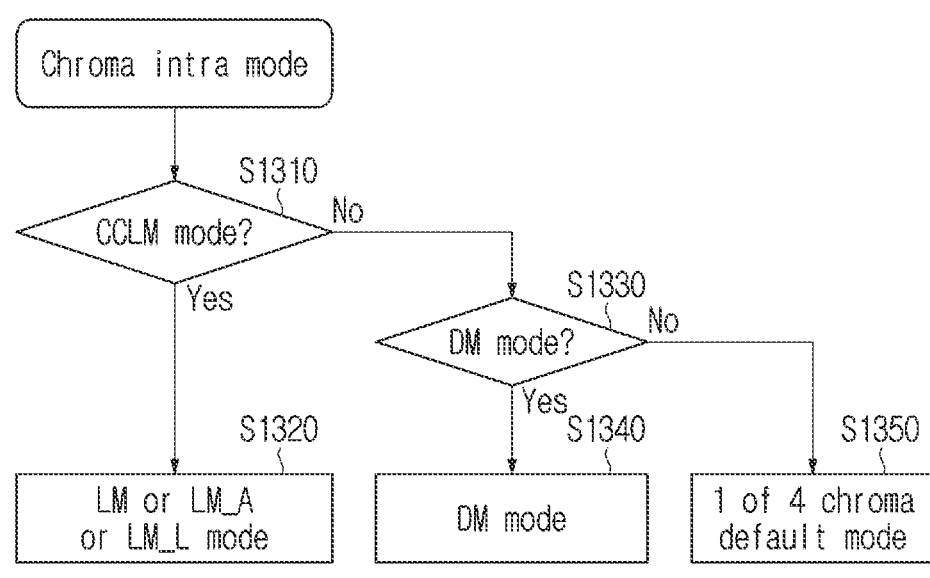

FIG. 13 is a flowchart showing a method of determining a chroma intra prediction mode according to an embodiment of the present disclosure.

Figures 14, 15:
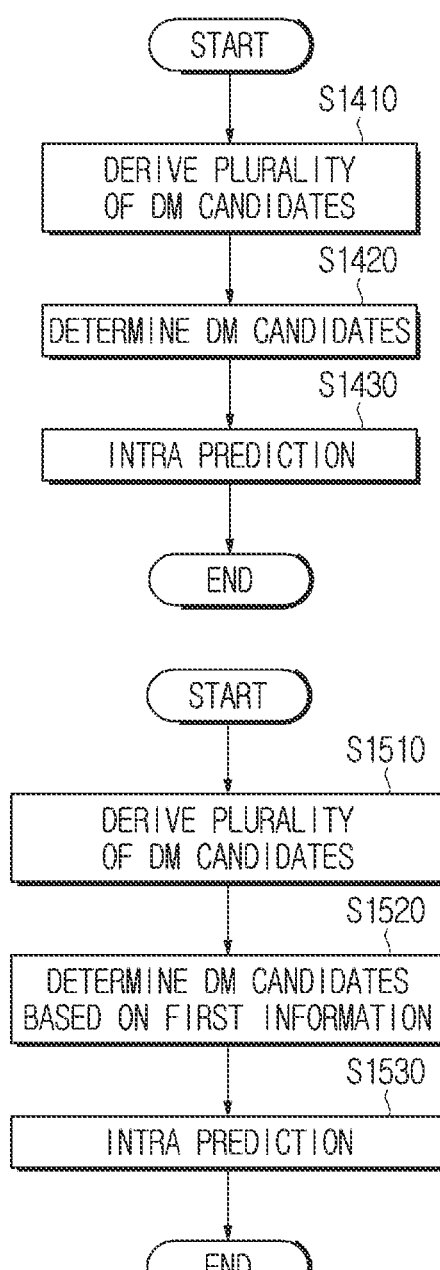

FIG. 14 is a flowchart showing an image encoding method according to an embodiment of the present disclosure.

FIG. 15 is a flowchart showing an image decoding method according to an embodiment of the present disclosure.

Figure 16:
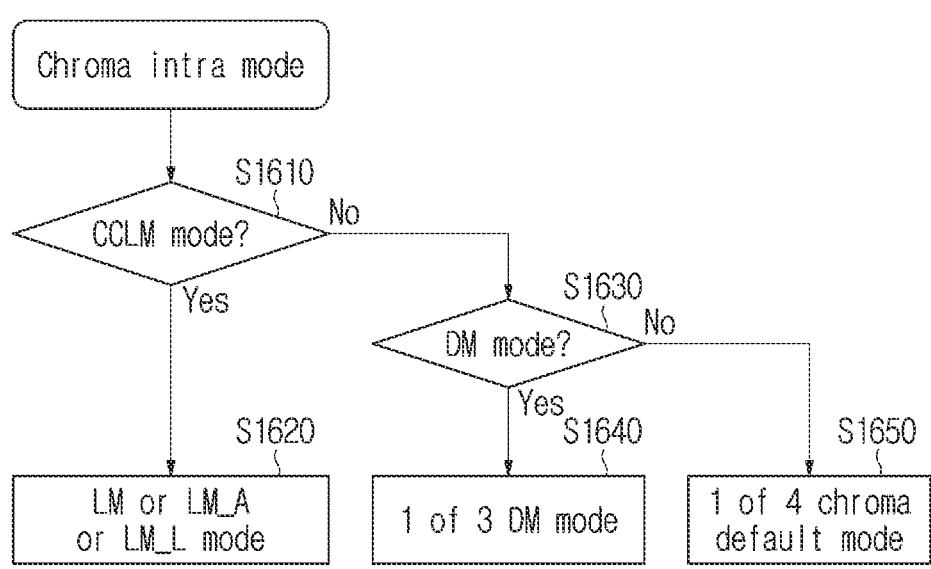

FIG. 16 is a flowchart showing a method of determining a chroma intra prediction mode according to another embodiment of the present disclosure.

Figure 17:
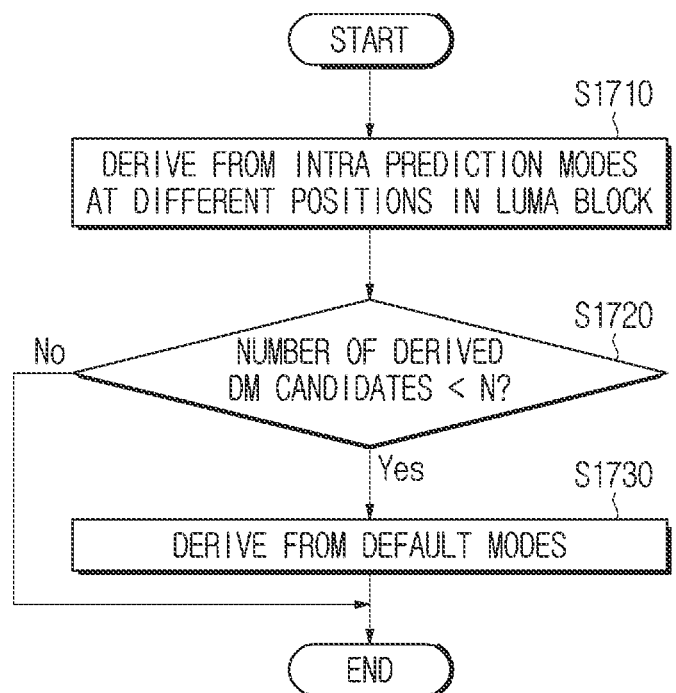

FIG. 17 is a flowchart showing a method of deriving a plurality of DM candidates according to another embodiment of the present disclosure.

Figure 18:
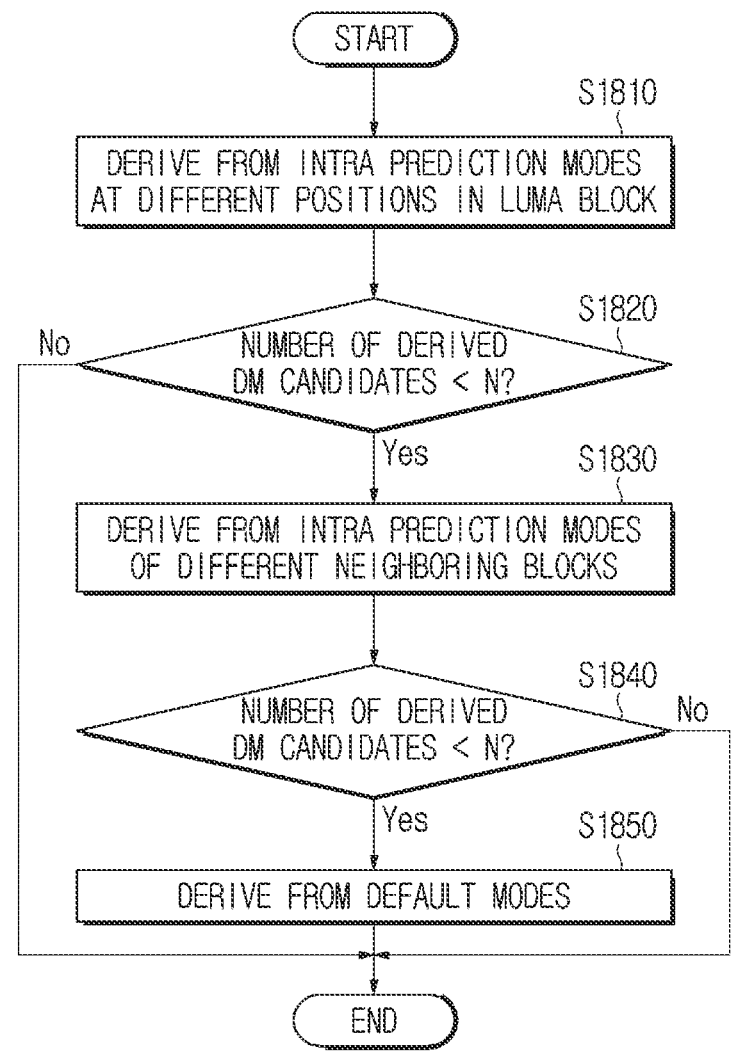

FIG. 18 is a flowchart showing a method of deriving a plurality of DM candidates according to another embodiment of the present disclosure.

Figure 19:
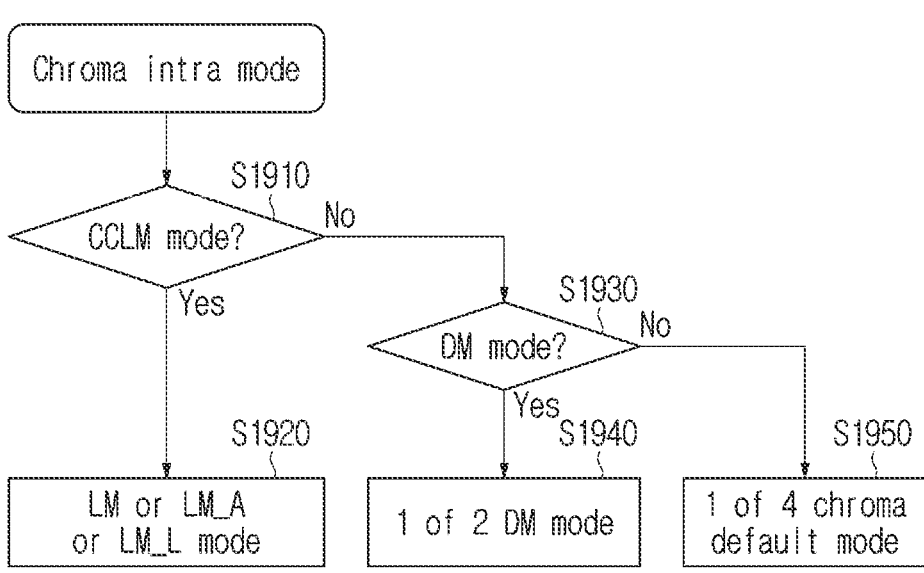

FIG. 19 is a flowchart showing a method of determining a chroma intra prediction mode according to another embodiment of the present disclosure.

Figure 20:
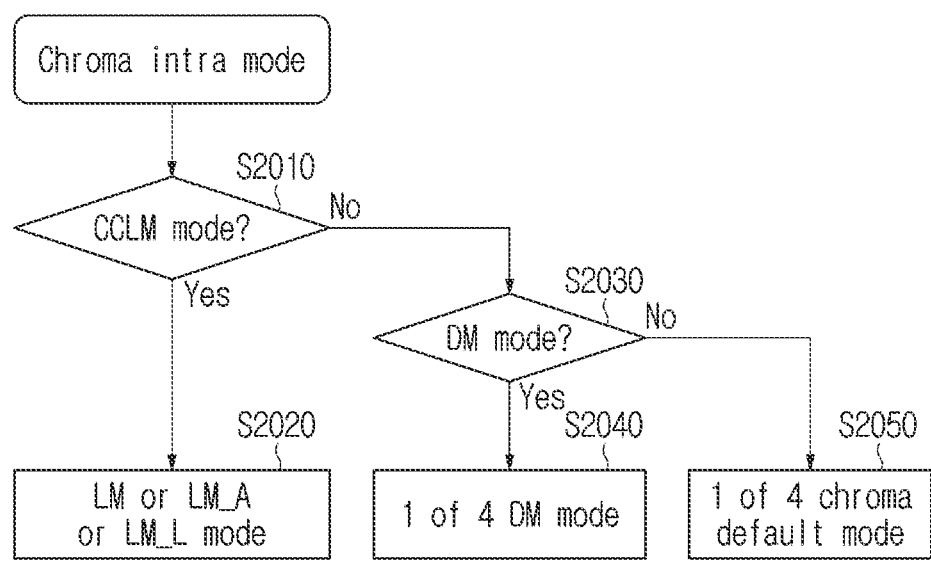

FIG. 20 is a flowchart showing a method of determining a chroma intra prediction mode according to another embodiment of the present disclosure.

Figure 21:
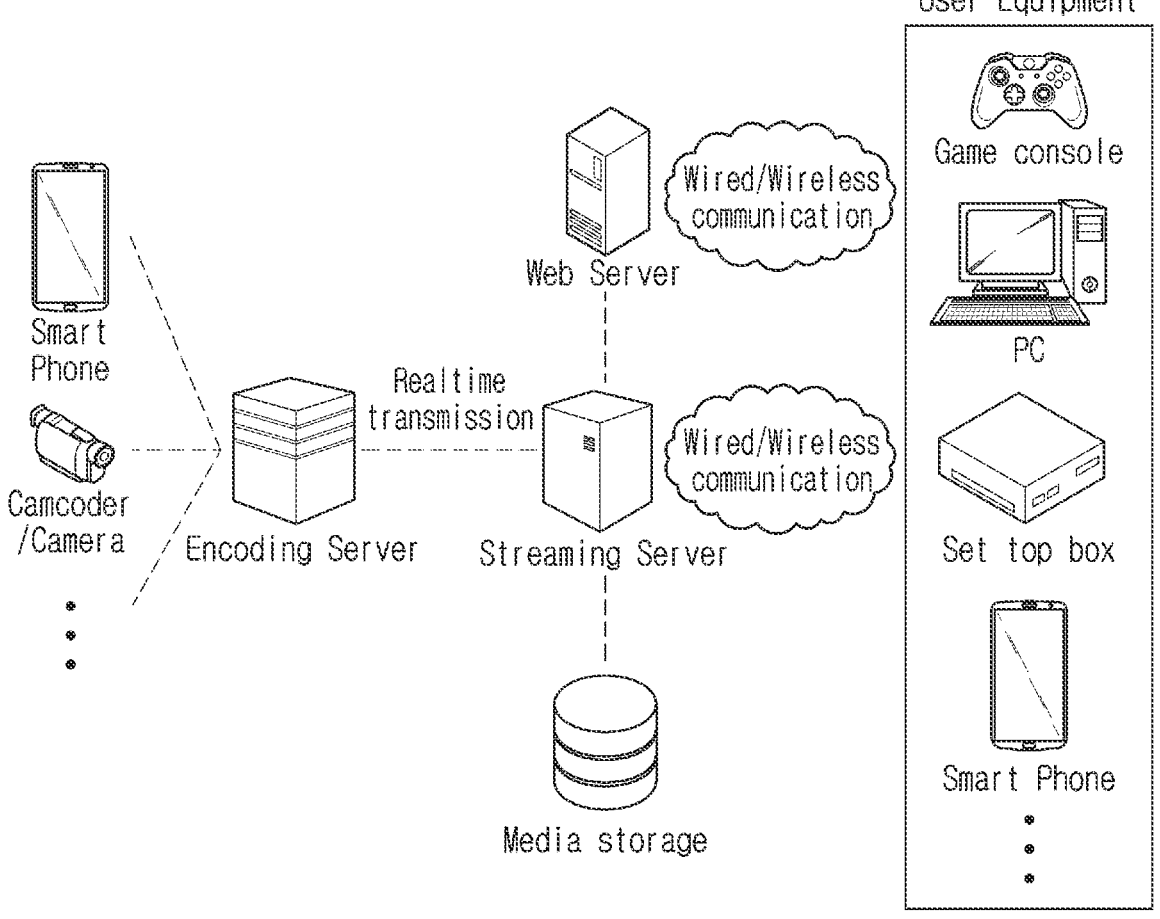

FIG. 21 is a view showing a content streaming system to which an embodiment of the present disclosure is applicable.

DETAILED DESCRIPTION

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, "picture" generally means the basis representing one image in a particular time period, and a slice/tile is an encoding basis constituting a part of a picture. One picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma (e.g., Cb, Cr) blocks. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed. "current block" may mean "current transform block" or "transform target block". When filtering is performed. "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or". For instance, the expression "A/B" and "A, B" may mean "A and/or B." Further, "A/B/C" and "A, B, C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively"

Overview of Video Coding System

Figure 1:
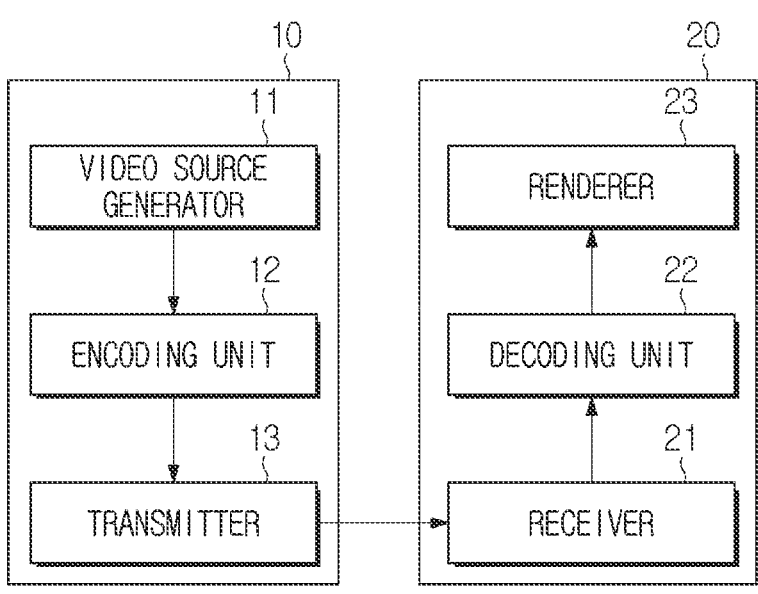
FIG. 1 is a view schematically showing a video coding system, to which an embodiment of the present disclosure is applicable.

FIG. 1 is a view showing a video coding system to which an embodiment of the present disclosure is applicable.

The video coding system according to an embodiment may include an encoding device 10 and a decoding device 20. The encoding device 10 may deliver encoded video and/or image information or data to the decoding device 20 in the form of a file or streaming via a digital storage medium or network.

The encoding device 10 according to an embodiment may include a video source generator 11, an encoding unit (encoder) 12 and a transmitter 13. The decoding device 20 according to an embodiment may include a receiver 21, a decoding unit (decoder) 22 and a renderer 23. The encoding unit 12 may be called a video/image encoding apparatus, and the decoding unit 22 may be called a video/image decoding apparatus. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may obtain the encoded video/image information or data output in the form of a bitstream and forward it to the receiver 21 of the decoding apparatus 20 or another external object through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The transmitter 13 may be provided as a transmission device separate from the encoding apparatus 12, and in this case, the transmission device may include at least one processor that acquires encoded video/image information or data output in the form of a bitstream and a transmission unit for transmitting it in the form of a file or streaming. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
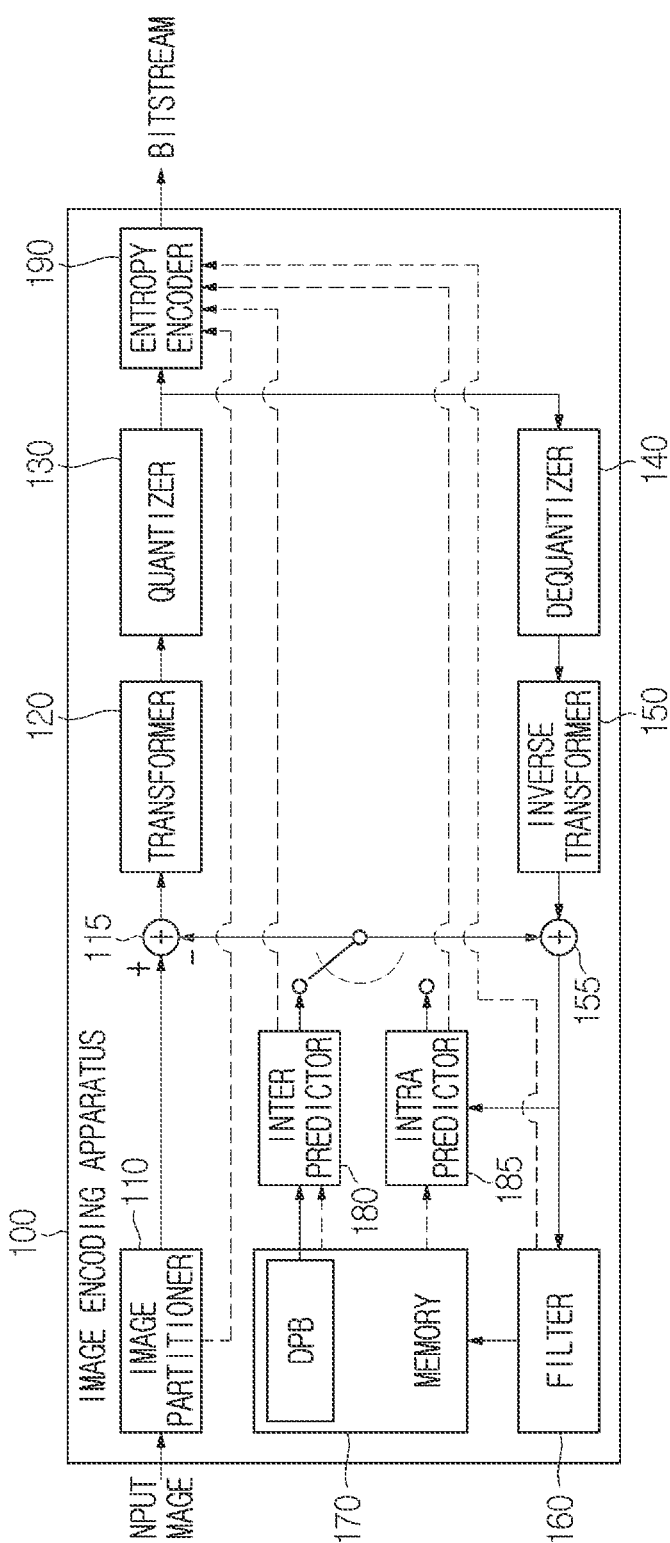
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit (intra predictor) 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit (inter predictor) 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CHIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is. IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD. DVD, Blu-ray. HDD. SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
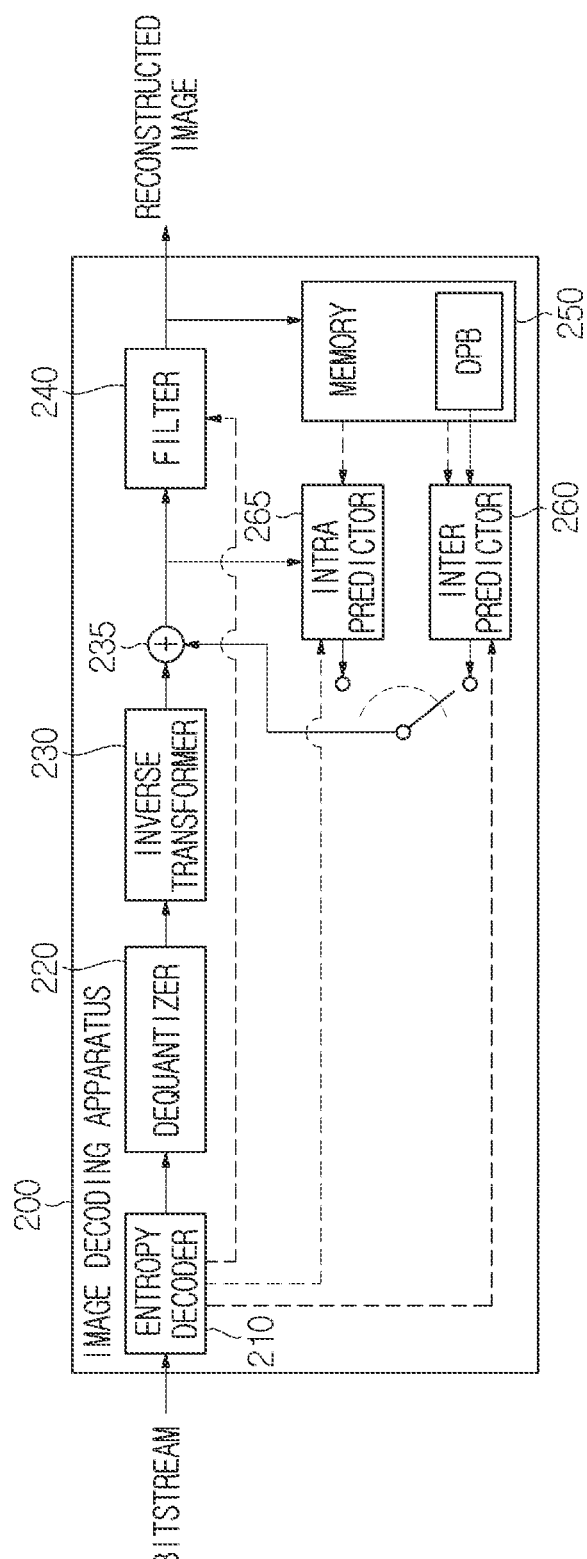
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra prediction unit 265. The inter predictor (inter prediction unit) 260 and the intra predictor (intra prediction unit) 265 may be collectively referred to as a "prediction unit (predictor)". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding. CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter predictor 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra predictor 265 may predict the current block by referring to the samples in the current picture. The description of the intra prediction unit 185 is equally applied to the intra prediction unit 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter predictor 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter predictor 260, and the intra predictor 265 of the image decoding apparatus 200.

Intra Prediction

Prediction may represent prediction for generating prediction samples for a current block based on reference samples in a picture to which a current block belongs (a current picture). When intra prediction is applied to a current block, neighboring reference samples to be used for intra prediction of the current block may be derived. The neighboring reference samples of the current block may include a total of 2×nh samples adjacent to a left boundary of the current block having a size of nW×nH and samples adjacent to a bottom-left, a total of 2×nW samples adjacent to a top boundary of the current block and samples adjacent to a top-right, and one sample adjacent to a top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block and one sample adjacent to a bottom-right of the current block.

However, some of the neighboring reference samples of the current block have not yet been decoded or may not be available. In this case, the image decoding apparatus 200 may construct neighboring reference samples to be used for prediction by substituting unavailable samples with available samples. Alternatively, neighboring reference samples to be used for prediction may be constructed through interpolation of available samples.

When the neighboring reference samples are derived. (i) a prediction sample may be derived based on an average or interpolation of neighboring reference samples of the current block, and (ii) the prediction sample may be derived based on a reference sample present in a specific (prediction) direction with respect to the prediction sample among the neighboring reference samples of the current block. The case of (i) may be called a non-directional mode or a non-angular mode, and the case of (ii) may be called a directional mode or an angular mode. Also, the prediction sample may be generated through interpolation of the second neighboring sample and the first neighboring sample positioned in the opposite direction of the prediction direction of the intra prediction mode of the current block based on the prediction sample of the current block among the neighboring reference samples. The above-described case may be referred to as linear interpolation intra prediction (LIP). In addition, chroma prediction samples may be generated based on luma samples using a linear model. This case may be called an LM mode. In addition, a temporary prediction sample of the current block may be derived based on the filtered neighboring reference samples, and the prediction sample of the current block may be derived by a weighted sum of at least one reference sample derived according to the intra prediction mode among the existing neighboring reference samples, that is, unfiltered neighboring reference samples, and the temporary prediction sample. The above-described case may be referred to as position dependent intra prediction (PDPC). In addition, a reference sample line with the highest prediction accuracy is selected from among multiple neighboring reference sample lines of the current block to derive the prediction sample using the reference sample located in the prediction direction in the corresponding line, and, at this time, intra prediction encoding may be performed by indicating (signaling) the used reference sample line to the image decoding apparatus 200. The above-described case may be referred to as multi-reference line (MRL) intra prediction or MRL-based intra prediction. In addition, intra prediction is performed based on the same intra prediction mode by partitioning the current block into vertical or horizontal sub-partitions, and neighboring reference samples may be derived and used in units of the sub-partitions. That is, in this case, the intra prediction mode for the current block is equally applied to the sub-partitions, but the intra prediction performance may be improved in some cases by deriving and using neighboring reference samples in units of sub-partitions. This prediction method may be called intra sub-partitions (ISP) or ISP-based intra prediction. The above-described intra prediction methods may be called an intra prediction type. The intra prediction type may be called various terms such as intra prediction technique or additional intra prediction mode. For example, the intra prediction type (or additional intra prediction mode, etc.) may include at least one of the aforementioned LIP, PDPC, MRL or ISP. A general intra prediction method excluding a specific intra prediction type such as LIP, LM, PDPC, MRL, and ISP may be referred to as a normal intra prediction type. The normal intra prediction type may be generally applied when the above specific intra prediction type is not applied, and prediction may be performed based on the above-described intra prediction mode. Meanwhile, if necessary, post-processing filtering may be performed on the derived prediction sample.

Specifically, the intra prediction procedure may include an intra prediction mode/type determination step, a neighboring reference sample derivation step, and an intra prediction mode/type based prediction sample derivation step. In addition, if necessary, a post-filtering step may be performed on the derived prediction sample.

Meanwhile, in addition to the above-described intra prediction types, affine linear weighted intra prediction (ALWIP) may be used. The ALWIP may be referred to as linear weighted intra prediction (LWIP) or matrix weighted intra prediction or matrix based intra prediction (MIP). If the MIP is applied to the current block, i) neighboring reference samples on which an averaging procedure has been performed is used, ii) matrix-vector-multiplication procedure is performed, and iii) a horizontal/vertical interpolation procedure is further performed to derive prediction samples for the current block as necessary. The intra prediction modes used for the MIP may be configured to be different from the intra prediction modes used in the LIP. PDPC, MRL, ISP intra prediction or normal intra prediction. The intra prediction mode for the MIP may be called a MIP intra prediction mode, a MIP prediction mode, or a MIP mode. For example, a matrix and offset used in the matrix vector multiplication may be set differently according to the intra prediction mode for the MIP. Here, the matrix may be called a (MIP) weighting matrix, and the offset may be called a (MIP) offset vector or a (MIP) bias vector.

Figure 4:
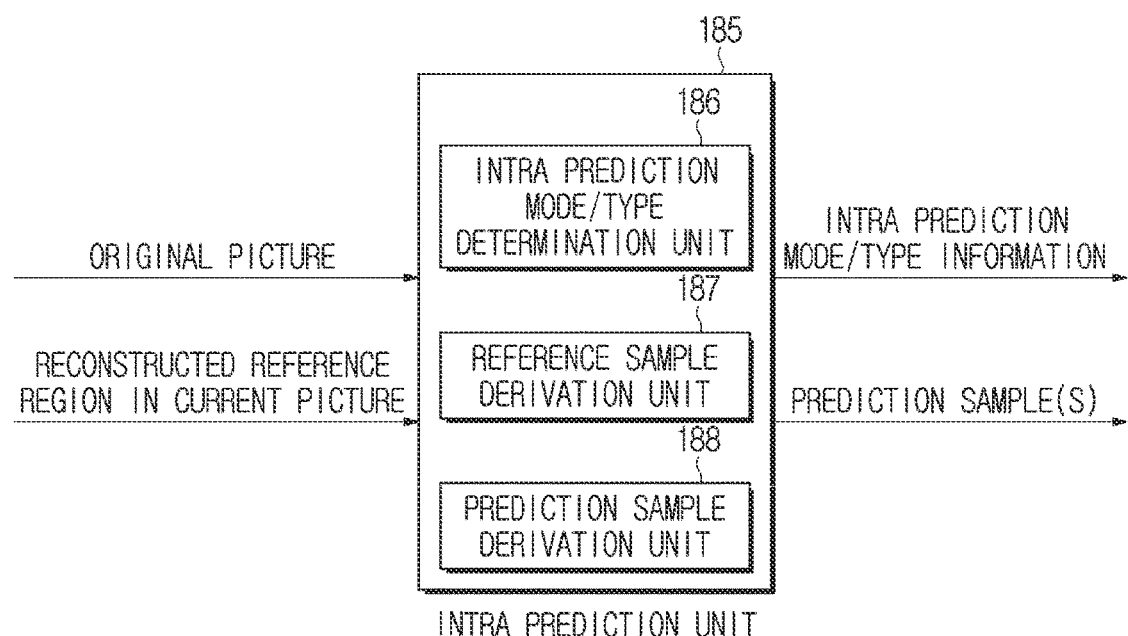
FIG. 4 is a diagram schematically showing an intra prediction unit of an image encoding apparatus.
Figure 5:
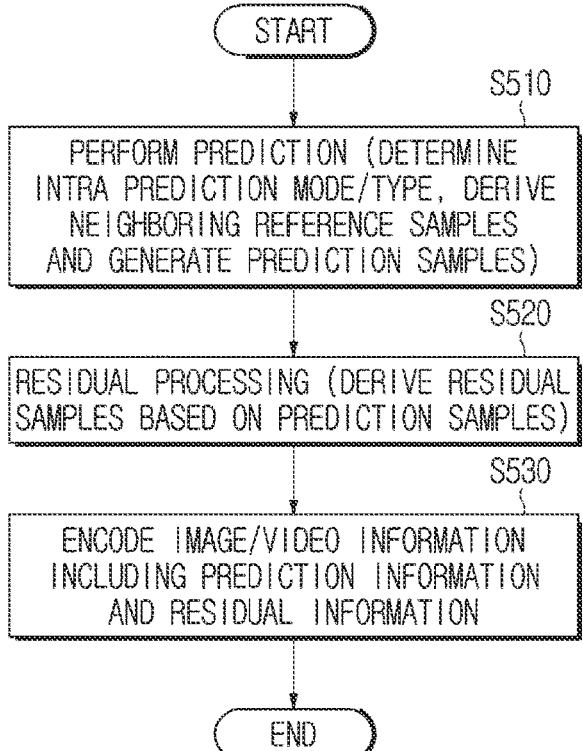
FIG. 5 is a flowchart showing a method of encoding an image based on intra prediction

FIG. 4 is a diagram schematically showing the intra prediction unit 185 of the image encoding apparatus 100, and FIG. 5 is a flowchart showing a method of encoding an image based on intra prediction.

Step S500 may be performed by the intra prediction unit 185 of the image encoding apparatus 100, and step S520 may be performed by the residual processor of the image encoding apparatus 100. Specifically, step S520 may be performed by the subtractor 115 of the image encoding apparatus 100. In step S530, prediction information may be derived by the intra prediction unit 185 and encoded by the entropy encoder 190. In step S530, residual information may be derived by the residual processor and encoded by the entropy encoder 190. The residual information is information about the residual samples. The residual information may include information about quantized transform coefficients for the residual samples. As described above, the residual samples may be derived as transform coefficients through the transformer 120 of the image encoding apparatus 100, and the transform coefficients may be derived as quantized transform coefficients through the quantizer 130. Information about the quantized transform coefficients may be encoded in the entropy encoder 190 through a residual coding procedure.

The image encoding apparatus 100 may perform intra prediction on the current block (S510). The image encoding apparatus 100 may derive an intra prediction mode/type for the current block, derive neighboring reference samples of the current block, and generate prediction samples in the current block based on the intra prediction mode/type and the neighboring reference samples. Here, a procedure for determining an intra prediction mode/type, a procedure for deriving neighboring reference samples and a procedure for generating prediction samples may be simultaneously performed, or any one procedure may be performed before another procedure. For example, the intra prediction unit 185 of the image encoding apparatus 100 may include an intra prediction mode/type determination unit 186, a reference sample derivation unit 187, a prediction sample derivation unit 188. The intra prediction mode/type determination unit 186 may determine the intra prediction mode/type for the current block, the reference sample derivation unit 187 may derive neighboring reference samples of the current block, and the prediction sample derivation unit 188 may derive the prediction samples of the current block. Meanwhile, although not shown, when the prediction sample filtering procedure is performed, the intra prediction unit 185 may further include a prediction sample filter (not shown). The image encoding apparatus 100 may determine a mode/type applied to the current block among a plurality of intra prediction modes/types. The image encoding apparatus 100 may compare RD costs of the intra prediction modes/types and determine an optimal intra prediction mode/type for the current block.

Meanwhile, the image encoding apparatus 100 may perform a prediction sample filtering procedure. Predictive sample filtering may be referred to as post filtering. Some or all of the prediction samples may be filtered by the prediction sample filtering procedure. In some cases, the prediction sample filtering procedure may be omitted.

The image encoding apparatus 100 may generate residual samples for the current block based on (filtered) prediction samples (S520). The image encoding apparatus 100 may compare the prediction samples with the original samples of the current block based on phase and derive the residual samples.

The image encoding apparatus 100 may encode image information including information on intra prediction (prediction information) and residual information of the residual samples (S530). The prediction information may include the intra prediction mode information and the intra prediction type information. The image encoding apparatus 100 may output encoded image information in the form of a bitstream. The output bitstream may be sent to the image decoding apparatus 200 through a storage medium or a network.

The residual information may include a residual coding syntax described below. The image encoding apparatus 100 may transform/quantize the residual samples to derive quantized transform coefficients. The residual information may include information on the quantized transform coefficients.

Meanwhile, as described above, the image encoding apparatus 100 may generate a reconstructed picture (including reconstructed samples and a reconstructed block). To this end, the image encoding apparatus 100 may perform dequantization/inverse transform with respect to the quantized transform coefficients again to derive (modified) residual samples. The residual samples are transformed/quantized and then dequantized/inversely transformed, in order to derive the same residual samples as the residual samples derived in the image decoding apparatus 200 as described above. The image encoding apparatus 100 may generate a reconstructed block including the reconstructed samples for the current block based on the prediction samples and the (modified) residual samples. A reconstructed picture for the current picture may be generated based on the reconstructed block. As described above, an in-loop filtering procedure is further applicable to the reconstructed picture.

Figure 6:
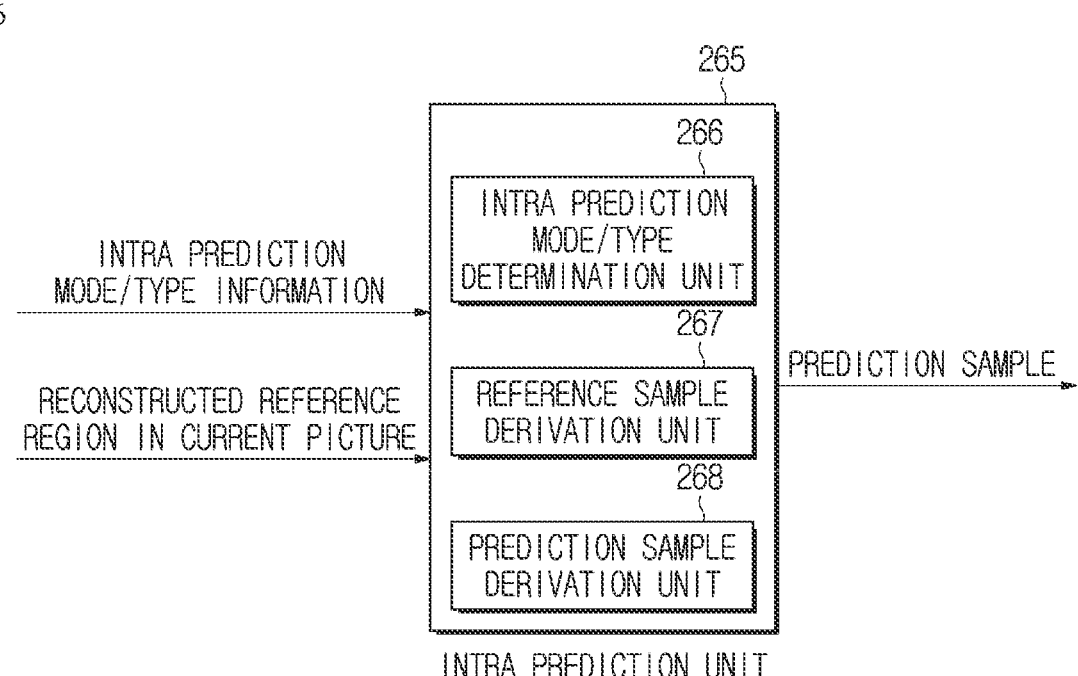
FIG. 6 is a diagram schematically showing an intra prediction unit of an image decoding apparatus.
Figure 7:
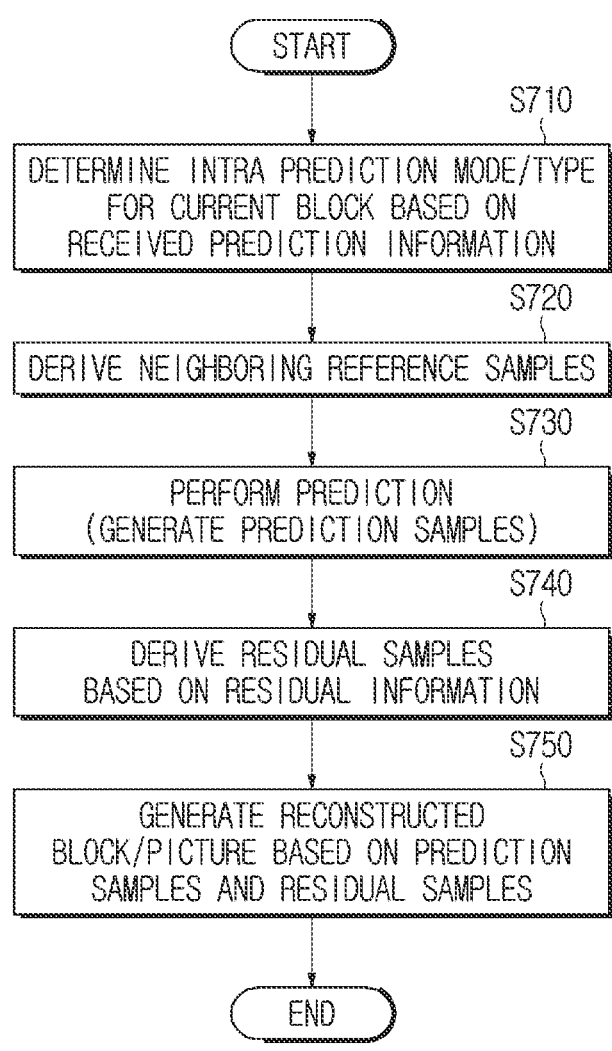
FIG. 7 is a flowchart showing a method of decoding an image based on intra prediction.

FIG. 6 is a diagram schematically showing the intra prediction unit of the image decoding apparatus 200, and FIG. 7 is a flowchart showing a method of decoding an image based on intra prediction.

The image decoding apparatus 200 may perform operation corresponding to operation performed by the image encoding apparatus 100.

Steps S710 to S720 may be performed by the intra prediction unit 265 of the image decoding apparatus 200, and the prediction information of step S730 and the residual information of step S740 may be obtained from a bitstream by the entropy decoding unit 210 of the image decoding apparatus 200. The residual processor of the image decoding apparatus 200 may derive the residual samples for the current block based on the residual information. Specifically, the dequantizer 220 of the residual processor may perform dequantization based on quantized transform coefficients derived based on the residual information to derive transform coefficients, and the inverse transformer 230 of the residual processor may perform inverse transform with respect to the transform coefficients to derive the residual samples for the current block. Step S750 may be performed by the adder 235 or the reconstructor of the image decoding apparatus 200.

Specifically, the image decoding apparatus 200 may derive an intra prediction mode/type for the current block based on the received prediction information (intra prediction mode/type information) (S710). The image decoding apparatus 200 may derive neighboring reference samples of the current block (S720). The image decoding apparatus 200 may generate prediction samples in the current blocks based on the intra prediction mode/type and the neighboring reference samples (S730). In this case, the image decoding apparatus 200 may perform a prediction sample filtering procedure. Predictive sample filtering may be referred to as post filtering. Some or all of the prediction samples may be filtered by the prediction sample filtering procedure. In some cases, the prediction sample filtering procedure may be omitted.

The image decoding apparatus 200 generates residual samples for the current block based on the received residual information. The image decoding apparatus 200 may generate reconstructed samples for the current block based on the prediction samples and the residual samples, and derive a reconstructed block including the reconstructed samples (S740). A reconstructed picture for the current picture may be generated based on the reconstructed block. As described above, the in-loop filtering procedure is further applicable to the reconstructed picture.

Here, the intra prediction unit 265 of the image decoding apparatus 200 may include an intra prediction mode/type determination unit 266, a reference sample derivation unit 267 and a prediction sample derivation unit 268, the intra prediction mode/type determination unit 266 may determine the intra prediction mode/type for the current block based on the intra prediction mode/type information generated and signaled by the intra prediction mode/type determination unit 186 of the image encoding apparatus 100, the reference sample derivation unit 266 may derive the neighboring reference samples of the current block, and the prediction sample derivation unit 267 may derive the prediction samples of the current block. Meanwhile, although not shown, when the above-described prediction sample filtering procedure is performed, the intra prediction unit 265 may further include a prediction sample filter (not shown).

The intra prediction mode information may include flag information (e.g., intra_luma_mpm_flag) specifying whether a most probable mode (MPM) or a remaining mode is applied to the current block, and, when the MPM is applied to the current block, the prediction mode information may further include index information (e.g., intra_luma_mpm_idx) specifying one of intra prediction mode candidates (MPM candidates). The intra prediction mode candidates (MPM candidates) may be configured as an MPM candidate list or an MPM list. In addition, when the MPM does not apply to the current block, the intra prediction mode information may further include remaining mode information (e.g., intra_luma_mpm_remainder) specifying one of the remaining intra prediction modes excluding the intra prediction mode candidates (MPM candidates). The image decoding apparatus 200 may determine the intra prediction mode of the current block based on the intra prediction mode information. For the above-described MIP, a separate MPM list may be configured.

In addition, the intra prediction type information may be implemented in various forms. For example, the intra prediction type information may include intra prediction type index information specifying one of the intra prediction types. As another example, the intra prediction type information may include at least one of reference sample line information (e.g., intra_luma_ref_idx)) specifying whether the MRL is applied to the current block and which reference sample line is used if applied. ISP flag information (e.g., intra_subpartitions_mode_flag) specifying whether the ISP is applied to the current block, ISP type information (e.g., intra_subpartitions_split_flag) specifying the split type of subpartitions when the ISP is applied, flag information specifying whether PDCP is applied or flag information specifying whether LIP is applied. In addition, the intra prediction type information may include a MIP flag specifying whether MIP is applied to the current block.

The intra prediction mode information and/or the intra prediction type information may be encoded/decoded through the coding method described in the present disclosure. For example, the intra prediction mode information and/or the intra prediction type information may be encoded/decoded through entropy coding (e.g., CABAC or CAVLC) based on truncated (rice) binary code.

Intra Prediction for Chroma Block

When intra prediction is performed on a current block, prediction on a luma component block (luma block) of the current block and prediction on a chroma component block (chroma block) may be performed, in which case the intra prediction mode for the chroma block may be set separately from the intra prediction mode for the luma block.

For example, the intra prediction mode for the chroma block may be indicated based on intra chroma prediction mode information, and the intra chroma prediction mode information may be signaled in the form of an intra_chroma_pred_mode syntax element. As an example, the intra chroma prediction mode information may indicate one of candidate modes including at least one of planar mode. DC mode, vertical mode, horizontal mode, derived mode (DM), L_CCLM, T_CCLM, or LT_CCLM mode. DM may also be called direct mode. CCLM may be called LM.

Meanwhile, DM and CCLM are dependent intra prediction modes that predict chroma blocks using luma block information. DM may indicate a mode in which the same intra prediction mode as the intra prediction mode for the luma block is applied as the intra prediction mode for the chroma block. In addition, CCLM may indicate an intra prediction mode in which reconstructed samples of the luma block are sub-sampled in a process of generating the prediction block for the chroma block, and then samples derived by applying the CCLM parameters $\alpha$ and $\beta$ to the subsampled samples are used as prediction samples of the chroma block.

MDM (Multiple DM)

MDM may be applied to a current chroma block. MDM may be a mode that uses DM, an existing single mode, by expanding it into multiple modes. That is, when configuring the intra prediction mode of a color difference image, multiple DMs may be selected from various positions illustrated in FIG. 8.

Intra prediction mode of the CR (center-right) position, TL (top-left) position, TR (top-right) position, BL (bottom-left) position, and BR (bottom-right) position of the collocated luminance block.

Intra prediction mode of the L (left) block, A (above) block, BL (bottom-left) block, AR (above-right) block, and AL (above-left) block of the neighboring block of the current chroma block PLANAR mode, DC mode Angular mode of the previously selected angular mode −1 or +1

Vertical mode, Horizontal mode, intra prediction mode of 2, intra prediction mode of 34, intra prediction mode of 66, intra prediction mode of 10, intra prediction mode of 26 (in case of 65 direction mode)

If five prediction modes (DMs) are not selected, the previously selected modes are copied and selected Entropy Coding The encoding process of CABAC first converts an input signal into a binary value through binarization when the input signal is a syntax element rather than a binary value. If the input signal is an already binary value, it is bypassed without binarization. Here, each binary 0 or 1 constituting the binary value is called a bin. For example, if the binary string (empty string) after binarization is 110, each of 1, 1, and 0 is called one bin. The bin(s) for one syntax element may indicate the value of the corresponding syntax element.

The binarized bins are input to a regular coding engine or a bypass coding engine. The regular coding engine assigns a context model that reflects probability values for the bin and encodes the bin based on the assigned context model. The regular coding engine may perform coding on each bin and then update a probability model of the corresponding bin. These coded bins are called context-coded bins. The bypass coding engine omits a procedure of estimating a probability for the input bin and a procedure of updating the probability model applied to the bin after coding. Instead of assigning contexts, the input bins are coded by applying a uniform probability distribution (ex. 50:50) to speed up coding. The coded bins are called bypass bins. The context model may be allocated and updated for each bin that is context coded (regularly coded), and the context model may be indicated based on ctxidx or ctxInc. ctxidx may be derived based on ctxInc. Specifically, for example, the context index (ctxidx) indicating the context model for each of the regularly coded bins may be derived as the sum of the context index increment (ctxInc) and the context index offset (ctxIdxOffset). Here, ctxIne may be derived differently for each bin. The ctxIdxOffset may be represented by the lowest value of the ctxIdx. The lowest value of the ctxIdx may be called an initial value of the ctxIdx. The ctxIdxOffset is a value generally used for distinguishing from the context models for other syntax elements, and the context model for one syntax element may be distinguished/derived based on ctxinc.

In the entropy encoding procedure, it is possible to determine whether to perform encoding through the regular coding engine or the encoding through the bypass coding engine and to switch a coding path. Entropy decoding is performed by the same process as entropy encoding in reverse order.

FIG. 9 is a diagram schematically showing the entropy encoder 190 of the image encoding apparatus 100, and FIG. 10 is a flowchart showing an entropy encoding method.

Referring to FIGS. 9 and 10, the image encoding apparatus 100 may perform an entropy coding procedure on image/video information. The image/video information may include partitioning related information, prediction related information (ex. inter/intra prediction classification information, intra prediction mode information, inter prediction mode information, etc.), residual information, in-loop filtering related information, and the like, or various syntax elements relating thereto. The entropy coding may be performed in syntax element units. S1010 to S1020 may be performed by the entropy encoder 190 of FIG. 1.

The image encoding apparatus 100 may perform binarization on a target syntax element (S1010). The binarization may be based on various binarization methods such as a truncated rice binarization process and a fixed-length binarization process, and the binarization method for the target syntax element may be predefined. The binarization procedure may be performed by a binarization unit 192 in the entropy encoder 190.

The image encoding apparatus 100 may perform entropy encoding on the target syntax element (S1020). The image encoding apparatus 100 may regular-coding-based (context-based) or bypass-coding-based encode an empty string of the target syntax element based on entropy coding techniques such as context-adaptive arithmetic coding (CABAC) or context-adaptive variable length coding (CAVLC) and an output thereof may be included in a bitstream. The entropy encoding procedure may be performed by an entropy encoding processor 193 in the entropy encoder 190. As described above, the bitstream may be sent to the image decoding apparatus 200 through a (digital) storage medium or a network.

FIG. 11 is a diagram schematically showing the entropy decoder 210 of the image decoding apparatus 200, and FIG. 12 is a flowchart showing an entropy decoding method.

Referring to FIGS. 11 and 12, the image decoding apparatus 200 may decode the encoded image/video information. The image/video information may include partitioning related information, prediction related information (ex.

inter/intra prediction classification information, intra prediction mode information, inter prediction mode information, etc.), residual information, in-loop filtering related information, and the like, or include various syntax elements relating thereto. The entropy coding may be performed in syntax element units. S1210 to S1220 may be performed by the entropy decoder 210 of FIG. 2.

The image decoding apparatus 200 may perform binarization on a target syntax element (S1210). Here, the binarization may be based on various binarization methods such as a truncated rice binarization process and a fixed-length binarization process, and the binarization method for the target syntax element may be predefined. The image decoding apparatus 200 may derive available empty strings (empty string candidates) for available values of the target syntax element through the binarization procedure. The binarization procedure may be performed by a binarization unit 212 in the entropy decoder 210.

The image decoding apparatus 200 performs entropy decoding on the target syntax element (S1220). The image decoding apparatus 200, while sequentially decoding and parsing each bin for the target syntax element from the input bit(s) in the bitstream, compares the derived bin string with the available bin strings for that syntax element. If the derived empty string is the same as one of the available empty strings, a value corresponding to that empty string is derived as the value of the syntax element. If not, the above procedure is performed again after further parsing a next bit in the bitstream. Through this process, the corresponding information may be signaled using a variable length bit without using a start bit or an end bit for the specific information (specific syntax element) in the bitstream. Through this, smaller bits may be allocated to lower values and overall coding efficiency may be improved.

The image decoding apparatus 200 may context-based or bypass-based decode each bin in the bin string from the bitstream based on an entropy coding technique such as CABAC or CAVLC. The bitstream may include various information for image/video decoding as described above. As described above, the bitstream may be sent to the image decoding apparatus 200 through a (digital) storage medium or a network.

EMBODIMENT

Embodiments of the present disclosure relate to intra prediction, and specifically to intra prediction of a chroma block and chroma multiple intra DM. In the description below. 'chroma intra prediction mode' may be an intra prediction mode for intra prediction of a (current) chroma block.

An example of a method of determining a chroma intra prediction mode according to an embodiment of the present disclosure is shown in FIG. 13. Referring to FIG. 13, it may be determined whether the chroma intra prediction mode is a CCLM mode (S1310), and if the chroma intra prediction mode is a CCLM mode, one of the LM mode, LM_A mode, or LM_L mode may be determined to be the chroma intra prediction mode (S1320). If it is not the CCLM mode, it may be determined whether it is a DM mode (S1330). When the chroma intra prediction mode is a DM mode, the intra prediction mode of the luma block covering the CR position of the co-located luma image of FIG. 8 may be determined to be the chroma intra prediction mode (S1340). If the chroma intra prediction mode is not a DM mode, any one of four default modes may be selected as the chroma intra prediction mode (S1350).

Figure 8:
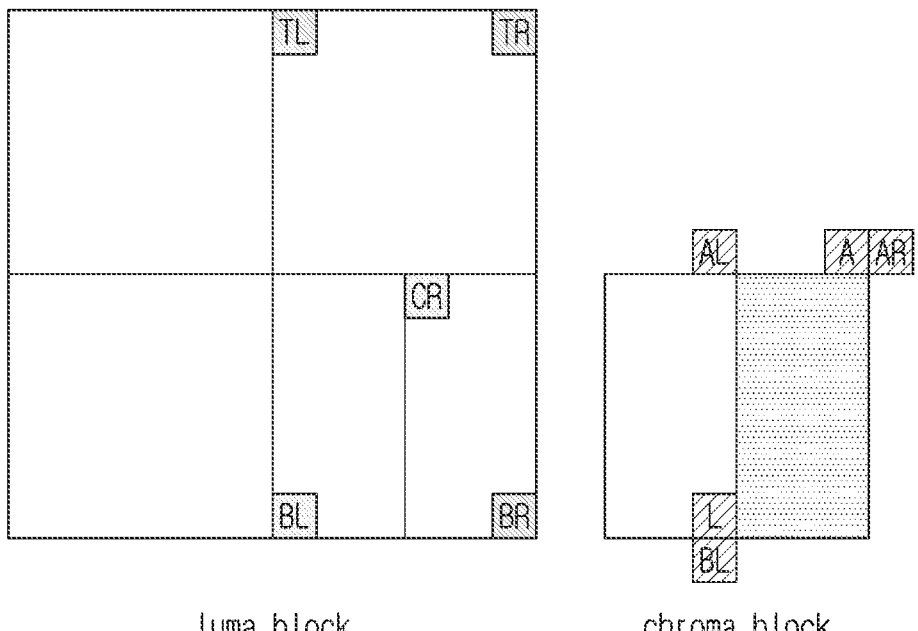

Meanwhile, as described above, MDM that expands a single mode, that is, a DM mode, into a plurality of modes may be applied, and in this case, a plurality of DMs may be selected from various positions illustrated in FIG. 8.

However, because the MDM method adaptively selects all chroma intra prediction mode candidates (MDM), the essential modes (essential mode or default mode) of the chroma intra prediction mode, such as PLANAR mode, DC mode, HORIZONTAL mode, and VERTICAL mode, may be excluded from the chroma intra prediction mode candidates.

The present disclosure proposes methods of configuring MDM while always maintaining default modes when configuring a chroma intra prediction mode. FIG. 14 is a flowchart showing an image encoding method according to an embodiment of the present disclosure, and FIG. 15 is a flowchart showing an image decoding method according to an embodiment of the present disclosure.

Referring to FIG. 14, the image encoding apparatus 100 may derive a plurality of DM candidates for a chroma block (S1410). The image encoding apparatus 100 may determine one DM candidate among the derived DM candidates (S1420). Depending on embodiments, the image encoding apparatus 100 may determine one mode among the default modes for the chroma block and the derived DM candidates (S1420).

Additionally, the image encoding apparatus 100 may intra-predict the chroma block based on the determined DM candidate (or determined mode) (S1430). Information (first information) about the determined DM candidate (or determined mode) may be encoded in a bitstream Information about the determined DM candidate (or determined mode), that is, first information, may be intra chroma prediction mode information (intra_chroma_pred_mode).

Referring to FIG. 15, the image decoding apparatus 200 may derive a plurality of DM candidates for a chroma block (S1510). The image decoding apparatus 200 may derive a plurality of DM candidates in the same manner as the image encoding apparatus 100.

The image decoding apparatus 200 may determine one of the plurality of DM candidates based on first information (S1520). Depending on embodiments, the image decoding apparatus 200 may determine one of the default modes for the chroma block and the derived DM candidates based on the first information (S1520). The first information may be obtained from a bitstream. The image decoding apparatus 200 may intra-predict the chroma block based on the determined DM candidate (or determined mode) (S1530).

Hereinafter, the embodiments of the present disclosure will be described in more detail.

Embodiment 1

Embodiment 1 proposes 1) a method of deriving three DM candidates more precisely. 2) a method of binarizing information about the plurality of derived DM candidates, and 3) a method of modifying default modes based on the plurality of derived DM candidates.

FIG. 16 shows an example of a method of determining a chroma intra prediction mode according to Embodiment 1. Referring to FIG. 16, it may be determined whether the chroma intra prediction mode is a CCLM mode (S1610), and if the chroma intra prediction mode is a CCLM mode, one of the LM mode. LM_A mode, or LM_L mode may be determined to be the chroma intra prediction mode (S1620). If it is not a CCLM mode, it may be determined whether it is a DM mode (S1630). When the chroma intra prediction mode is a DM mode, any one of three DM candidates may be determined to be the chroma intra prediction mode (S1640). If the chroma intra prediction mode is not a DM mode, any one of four default modes may be selected as the chroma intra prediction mode (S1650).

Embodiment 1-1

Embodiment 1-1 is a method of deriving DM candidates precisely.

FIG. 17 is a flowchart showing a method of deriving three DM candidates.

Referring to FIG. 17, the image encoding apparatus 100 and the image decoding apparatus 200 may derive a plurality of DM candidates from intra prediction modes at different positions in a luma block corresponding to a chroma block (S1710).

For example, the image encoding apparatus 100 and the image decoding apparatus 200 sequentially search different positions within the luma block, and derive DM candidates from the intra prediction modes of the different searched positions on a first-come, first-served basis according to the search order.

Different positions within the luma block and their search order may be as follows.

1. Intra prediction mode of CR position of co-located luma block
2. Intra prediction mode of BL position of co-located luma block
3. Intra prediction mode of TR position of co-located luma block
4. Intra prediction mode of TL position of co-located luma block
5. Intra prediction mode of BR position of co-located luma block The image encoding apparatus 100 and the image decoding apparatus 200 may determine whether the number of DM candidates derived from intra prediction modes 1 to 5 is less than a predetermined number (3) (S1720).

If the number of DM candidates derived from intra prediction modes 1 to 5 is less than a predetermined number (3), the image encoding apparatus 100 and the image decoding apparatus 200 may derive DM candidates from the default modes (S1730). That is, derivation of DM candidates using default modes may be performed when the number of DM candidates derived using intra prediction modes at different positions within the co-located luma block is less than a predetermined number.

The number of default modes used to derive DM candidates may be the same as the predetermined number (3). The default modes used to derive DM candidates and their search order may be as follows.

6. PLANAR intra prediction mode
7. VERTICAL intra prediction mode
8. HORIZONTAL intra prediction mode The search order 1 to 8 described above represents an example for deriving DM candidates. The search order 1 to 5 may be changed, and the default modes 6 to 8 may also be replaced with other modes.

FIG. 18 is a flowchart showing another method of deriving three DM candidates.

Referring to FIG. 18, the image encoding apparatus 100 and the image decoding apparatus 200 may derive a plurality of DM candidates from intra prediction modes at different positions in a luma block corresponding to a chroma block (S1810).

For example, the image encoding apparatus 100 and the image decoding apparatus 200 sequentially search different positions in the luma block, and derive DM candidates from the intra prediction modes of the different searched positions on a first-come, first-served basis according to the search order.

Different positions within the luma block and their search order may be as follows.

1. Intra prediction mode of CR position of co-located luma block
2. Intra prediction mode of BL position of co-located luma block
3. Intra prediction mode of TR position of co-located luma block
4. Intra prediction mode of TL position of co-located luma block
5. Intra prediction mode of BR position of co-located luma block The image encoding apparatus 100 and the image decoding apparatus 200 may determine whether the number of DM candidates derived from intra prediction modes 1 to 5 is less than a predetermined number (3) (S1820).

If the number of DM candidates derived from intra prediction modes 1 to 5 is less than a predetermined number (3), the image encoding apparatus 100 and the image decoding apparatus 200 may derive DM candidates from intra prediction modes of different neighboring blocks of the chroma block (S1830).

For example, the image encoding apparatus 100 and the image decoding apparatus 200 may sequentially search neighboring blocks of the chroma block and derive DM candidates from the intra prediction modes of the searched neighboring blocks on a first-come, first-served basis according to the search order. The neighboring blocks of the chroma block and their search order may be as follows.

6. Intra prediction mode of L block, which is neighboring block of chroma block
7. Intra prediction mode of A block, which is neighboring block of chroma block
8. Intra prediction mode of BL block, which is neighboring block of chroma block
9. Intra prediction mode of AR block, which is neighboring block of chroma block
10. Intra prediction mode of AL block, which is neighboring block of chroma block The image encoding apparatus 100 and the image decoding apparatus 200 may determine whether the number of DM candidates derived through steps S1810 and $1830 is less than a predetermined number (3) (S1840).

If the number of DM candidates derived from intra prediction modes 1 to 10 is less than a predetermined number (3), the image encoding apparatus 100 and the image decoding apparatus 200 may derive DM candidates from default modes (S1830). That is, derivation of DM candidates using default modes may be performed when the number of DM candidates derived using different positions in the co-located luma block and neighboring blocks of the chroma block is less than a predetermined number (3).

The number of default modes used to derive DM candidates may be equal to the predetermined number (3). The default modes used to derive DM candidates and their search order may be as follows.

11. PLANAR intra prediction mode
12. VERTICAL intra prediction mode
13. HORIZONTAL intra prediction mode The search order 1 to 13 described above represents an example for deriving DM candidates. The search order 1 to 10 may be changed, and the default modes 11 to 13 may also be replaced with other modes.

Embodiment 1-2

Embodiment 1-2 is a method of binarizing information about a plurality of derived DM candidates.

The image encoding apparatus 100 encodes information about three derived DM candidates through binarization, and the information about the encoded DM candidates may be modeled and signaled through context modeling. An example of context modeling of DM candidates is shown in Table 1.

TABLE 1

| Chroma mode | Context model 0 | Context model 1 |
|---|---|---|
| DM mode 0 | 1 | |
| DM mode 1 | 0 | 0 |
| DM mode 2 | 0 | 1 |

As illustrated in Table 1, the first selected (derived) DM candidate may be encoded and decoded into 1 bit and signaled through context modeling, and the second and third selected DM candidates may be encoded and decoded into 2 bits and then signaled through context modeling. Depending on the embodiment, in order to reduce data throughput in the image decoding apparatus 200, 1-bit or 2-bit encoding and decoding of DM candidates may be performed through a bypass model excluding context modeling.

Embodiment 1-3

Embodiment 1-3 may correspond to a method of modifying default modes based on a plurality of derived DM candidates. That is, Embodiment 1-3 may correspond to a pruning check method to remove overlap between derived DM candidates and default modes.

The image encoding apparatus 100 and the image decoding apparatus 200 may modify default modes based on whether the default modes overlap with the derived DM modes. That is, the default modes may be modified into different prediction modes based on the order in which the default modes are determined to be the same as the DM candidates.

For example, among the default modes (PLANAR mode, VERTICAL mode, HORIZONTAL mode and DC mode), the default mode that firstly overlaps with DM candidates may be modified to Vertical diagonal mode (intra prediction mode of 66), the default mode that secondly overlaps with the DM candidates may be modified to Diagonal mode (intra prediction mode of 34), and the default mode that thirdly overlaps with the DM candidates may be modified to intra prediction mode of 2.

As another example, when PLANAR mode, intra prediction mode of 27, and DC mode are derived to be DM candidates, the default mode may be modified to Vertical diagonal mode. VERTICAL mode, HORIZONTAL mode, and Diagonal mode. As another example, when intra prediction mode of 36, intra prediction mode of 27, and VERTICAL mode are derived to be DM candidates, the default mode may be modified to PLANAR mode, Vertical diagonal mode. HORIZONTAL mode, and DC mode. A combination of Vertical diagonal mode.

Diagonal mode, and intra prediction mode of 2, which are the overlapping replacement modes in the example above, may be replaced with a combination of other modes.

Embodiment 2

Embodiment 2 proposes 1) a method of deriving two DM candidates more precisely, 2) a method of binarizing information about the plurality of derived DM candidates, and 3) a method of modifying default modes based on the plurality of derived DM candidates.

FIG. 19 shows an example of a method of determining a chroma intra prediction mode according to Embodiment 2. Referring to FIG. 19, it may be determined whether the chroma intra prediction mode is a CCLM mode (S1910), and if the chroma intra prediction mode is a CCLM mode, one of the LM mode. LM_A mode, or LM_L mode may be determined to be the chroma intra prediction mode (S1920). If it is not a CCLM mode, it may be determined whether it is a DM mode (S1930). When the chroma intra prediction mode is a DM mode, any one of two DM candidates may be determined to be the chroma intra prediction mode (S1940). If the chroma intra prediction mode is not a DM mode, any one of four default modes may be selected as the chroma intra prediction mode (S1950).

Embodiment 2-1

Embodiment 2-1 is a method of deriving DM candidates precisely.

FIG. 17 is a flowchart showing a method of deriving two DM candidates.

Referring to FIG. 17, the image encoding apparatus 100 and the image decoding apparatus 200 may derive two DM candidates from intra prediction modes at different positions in a luma block corresponding to a chroma block (S1710).

For example, the image encoding apparatus 100 and the image decoding apparatus 200 sequentially search different positions in the luma block, and derive DM candidates from the intra prediction modes at the different searched positions on a first-come, first-served basis according to the search order.

Different positions within the luma block and their search order may be as follows.
1. Intra prediction mode of CR position of co-located luma block
2. Intra prediction mode of BL position of co-located luma block
3. Intra prediction mode of TR position of co-located luma block
4. Intra prediction mode of TL position of co-located luma block
5. Intra prediction mode of BR position of co-located luma block The image encoding apparatus 100 and the image decoding apparatus 200 may determine whether the number of DM candidates derived from intra prediction modes 1 to 5 is less than a predetermined number (2) (S1720).

If the number of DM candidates derived from intra prediction modes 1 to 5 is less than a predetermined number (2), the image encoding apparatus 100 and the image decoding apparatus 200 may derive DM candidates from the default modes (S1730). That is, derivation of DM candidates using default modes may be performed when the number of DM candidates derived using intra prediction modes at different positions in the co-located luma block is less than a predetermined number (2).

The number of default modes used to derive DM candidates may be the same as the predetermined number (2). The default modes used to derive DM candidates and their search order may be as follows.
6. PLANAR intra prediction mode
7. VERTICAL intra prediction mode The search order 1 to 7 described above represents an example for deriving DM candidates. The search order 1 to 5 may be changed, and the default modes 6 to 7 may also be replaced with other modes.

FIG. 18 is a flowchart showing another method of deriving two DM candidates.

Referring to FIG. 18, the image encoding apparatus 100 and the image decoding apparatus 200 may derive two DM candidates from intra prediction modes at different positions in a luma block corresponding to a chroma block (S1810).

For example, the image encoding apparatus 100 and the image decoding apparatus 200 sequentially search different positions in the luma block, and derive DM candidates from the intra prediction modes at the different searched positions on a first-come, first-served basis according to the search order.

Different positions within the luma block and their search order may be as follows.
1. Intra prediction mode of CR position of co-located luma block
2. Intra prediction mode of BL position of co-located luma block
3. Intra prediction mode of TR position of co-located luma block
4. Intra prediction mode of TL position of co-located luma block
5. Intra prediction mode of BR position of co-located luma block The image encoding apparatus 100 and the image decoding apparatus 200 may determine whether the number of DM candidates derived from intra prediction modes 1 to 5 is less than a predetermined number (2) (S1820).

If the number of DM candidates derived from intra prediction modes 1 to 5 is less than a predetermined number (2), the image encoding apparatus 100 and the image decoding apparatus 200 may derive DM candidates from intra prediction modes of different neighboring blocks of the chroma block (S1830). For example, the image encoding apparatus 100 and the image decoding apparatus 200 may sequentially search neighboring blocks of the chroma block and derive DM candidates from the intra prediction modes of the searched neighboring blocks on a first-come, first-served basis according to the search order. The neighboring blocks of the chroma block and their search order may be as follows.
6. Intra prediction mode of L block, which is neighboring block of chroma block
7. Intra prediction mode of A block, which is neighboring block of chroma block
8. Intra prediction mode of BL block, which is neighboring block of chroma block
9. Intra prediction mode of AR block, which is neighboring block of chroma block
10. Intra prediction mode of AL block, which is neighboring block of chroma block The image encoding apparatus 100 and the image decoding apparatus 200 may determine whether the number of DM candidates derived through steps S1810 and S1830 is less than a predetermined number (2) (S1840).

If the number of DM candidates derived from intra prediction modes 1 to 10 is less than a predetermined number (2), the image encoding apparatus 100 and the image decoding apparatus 200 may derive DM candidates from default modes (S1830). That is, derivation of DM candidates using default modes may be performed when the number of DM candidates derived using different positions within the co-located luma block and neighboring blocks of the chroma block is less than a predetermined number (2).

The number of default modes used to derive DM candidates may be the same as the predetermined number (2). The default modes used to derive DM candidates and their search order may be as follows.

11. PLANAR intra prediction mode

12. VERTICAL intra prediction mode

The search order 1 to 12 described above represents an example for deriving DM candidates. The search order 1 to 10 may be changed, and the default modes 11 to 12 may also be replaced with other modes.

Embodiment 2-2

Embodiment 2-2 is a method of binarizing information about a plurality of derived DM candidates.

The image encoding apparatus 100 encodes information about two derived DM candidates through binarization, and the information about the encoded DM candidates may be modeled and signaled through context modeling. An example of context modeling of DM candidates is shown in Table 2.

TABLE 2

| Chroma mode | Context model 0 |
|---|---|
| DM mode 0 | 1 |
| DM mode 1 | 0 |

As illustrated in Table 2, two DM candidates may be encoded and decoded into 1 bit and signaled through context modeling. Depending on the embodiment, in order to reduce data throughput in the image decoding apparatus 200, 1-bit encoding and decoding of DM candidates may be performed through a bypass model excluding context modeling.

Embodiment 2-3

Embodiment 2-3 may correspond to a method of modifying default modes based on a plurality of derived DM candidates. That is, Embodiment 2-3 may correspond to a pruning check method to remove overlap between derived DM candidates and default modes.

The image encoding apparatus 100 and the image decoding apparatus 200 may modify default modes based on whether the default modes overlap with the derived DM modes. That is, the default modes may be modified into different prediction modes based on the order in which the default modes are determined to be the same as the DM candidates.

For example, among the default modes (PLANAR mode, VERTICAL mode. HORIZONTAL mode and DC mode), the default mode that firstly overlaps with DM candidates may be modified to Vertical diagonal mode (intra prediction mode of 66), and the default mode that secondly overlaps with the candidates may be modified to Diagonal mode (intra prediction mode of 34).

As another example, when PLANAR mode and DC mode are derived to be DM candidates, the default mode may be modified to Vertical diagonal mode, VERTICAL mode, HORIZONTAL mode, and Diagonal mode. As another example, when intra prediction mode of 27 and VERTICAL mode are derived to be DM candidates, the default mode may be modified to PLANAR mode, Vertical diagonal mode, HORIZONTAL mode, and DC mode. A combination of Vertical diagonal mode and Diagonal mode, which are the overlapping replacement modes in the example above, may be replaced with a combination of other modes.

Embodiment 3

Embodiment 3 proposes 1) a method of deriving four DM candidates more precisely. 2) a method of binarizing information about the plurality of derived DM candidates, and 3) a method of modifying default modes based on the plurality of derived DM candidates.

FIG. 20 shows an example of a method of determining a chroma intra prediction mode according to Embodiment 3. Referring to FIG. 20, it may be determined whether the chroma intra prediction mode is a CCLM mode (S2010), and if the chroma intra prediction mode is a CCLM mode, one of the LM mode. LM_A mode, or LM_L mode may be determined to be the chroma intra prediction mode (S2020). If it is not a CCLM mode, it may be determined whether it is a DM mode (S2030). When the chroma intra prediction mode is a DM mode, any one of three DM candidates may be determined to be the chroma intra prediction mode (S2040). If the chroma intra prediction mode is not a DM mode, any one of four default modes may be selected as the chroma intra prediction mode (S2050).

Embodiment 3-1

Embodiment 3-1 is a method of deriving DM candidates precisely. FIG. 17 is a flowchart showing a method of deriving four DM candidates.

Referring to FIG. 17, the image encoding apparatus 100 and the image decoding apparatus 200 may derive four DM candidates from intra prediction modes at different positions in a luma block corresponding to a chroma block (S1710).

For example, the image encoding apparatus 100 and the image decoding apparatus 200 sequentially search different positions in the luma block, and derive DM candidates from the intra prediction modes at the different searched positions on a first-come, first-served basis according to the search order.

Different positions within the luma block and their search order may be as follows.

1. Intra prediction mode of CR position of co-located luma block

2. Intra prediction mode of BL position of co-located luma block

3. Intra prediction mode of TR position of co-located luma block

4. Intra prediction mode of TL position of co-located luma block

5. Intra prediction mode of BR position of co-located luma block

The image encoding apparatus 100 and the image decoding apparatus 200 may determine whether the number of DM candidates derived from intra prediction modes 1 to 5 is less than a predetermined number (4) (S1720).

If the number of DM candidates derived from intra prediction modes 1 to 5 is less than a predetermined number (4), the image encoding apparatus 100 and the image decoding apparatus 200 may derive DM candidates from the default modes (S1730). That is, derivation of DM candidates using default modes may be performed when the number of DM candidates derived using intra prediction modes at different positions in the co-located luma block is less than a predetermined number.

The number of default modes used to derive DM candidates may be the same as the predetermined number (4). The default modes used to derive DM candidates and their search order may be as follows.

6. PLANAR intra prediction mode

7. VERTICAL intra prediction mode

8. HORIZONTAL intra prediction mode

9. DC intra prediction mode

The search order 1 to 9 described above represents an example for deriving DM candidates. The search order 1 to 5 may be changed, and the default modes 6 to 9 may also be replaced with other modes.

FIG. 18 is a flowchart showing another method of deriving four DM candidates.

Referring to FIG. 18, the image encoding apparatus 100 and the image decoding apparatus 200 may derive four DM candidates from intra prediction modes at different positions in a luma block corresponding to a chroma block (S1810).

For example, the image encoding apparatus 100 and the image decoding apparatus 200 sequentially search different positions in the luma block, and derive DM candidates from the intra prediction modes at the different searched positions on a first-come, first-served basis according to the search order.

Different positions within the luma block and their search order may be as follows.

1. Intra prediction mode of CR position of co-located luma block

2. Intra prediction mode of BL position of co-located luma block

3. Intra prediction mode of TR position of co-located luma block

4. Intra prediction mode of TL position of co-located luma block

5. Intra prediction mode of BR position of co-located luma block

The image encoding apparatus 100 and the image decoding apparatus 200 may determine whether the number of DM candidates derived from intra prediction modes 1 to 5 is less than a predetermined number (4) (S1820).

If the number of DM candidates derived from intra prediction modes 1 to 5 is less than a predetermined number (4), the image encoding apparatus 100 and the image decoding apparatus 200 may derive DM candidates from intra prediction modes of different neighboring blocks of the chroma block (S1830).

For example, the image encoding apparatus 100 and the image decoding apparatus 200 may sequentially search neighboring blocks of a chroma block and derive DM candidates from the intra prediction modes of the searched neighboring blocks on a first-come, first-served basis according to the search order. The neighboring blocks of the chroma block and their search order may be as follows.

6. Intra prediction mode of L block, which is neighboring block of chroma block

7. Intra prediction mode of A block, which is neighboring block of chroma block

8. Intra prediction mode of BL block, which is neighboring block of chroma block 9. Intra prediction mode of AR block, which is neighboring block of chroma block 10. Intra prediction mode of AL block, which is neighboring block of chroma block The image encoding apparatus 100 and the image decoding apparatus 200 may determine whether the number of DM candidates derived through steps S1810 and S1830 is less than a predetermined number (4) (S1840).

If the number of DM candidates derived from intra prediction modes 1 to 10 is less than a predetermined number (4), the image encoding apparatus 100 and the image decoding apparatus 200 may derive DM candidates from default modes (S1830). That is, derivation of DM candidates using default modes may be performed when the number of DM candidates derived using different positions in the co-located luma block and neighboring blocks of the chroma block is less than a predetermined number (4).

The number of default modes used to derive DM candidates may be the same as the predetermined number (4). The default modes used to derive DM candidates and their search order may be as follows.

11. PLANAR intra prediction mode

12. VERTICAL intra prediction mode

13. HORIZONTAL intra prediction mode

14. DC intra prediction mode

The search order 1 to 14 described above represents an example for deriving DM candidates. The search order 1 to 10 may be changed, and the default modes 11 to 14 may also be replaced with other modes.

Embodiment 3-2

Embodiment 3-2 is a method of binarizing information about a plurality of derived DM candidates.

The image encoding apparatus 100 encodes information about four derived DM candidates through binarization, and the information about the encoded DM candidates may be modeled and signaled through context modeling. An example of context modeling of DM candidates is shown in Table 3.

TABLE 3

| Chroma mode | Context model 0 | Context model 1 |
|---|---|---|
| DM mode 0 | 0 | 0 |
| DM mode 1 | 0 | 1 |
| DM mode 2 | 1 | 0 |
| DM mode 3 | 1 | 1 |

As illustrated in Table 3, four DM candidates may be encoded and decoded into 2 bits and signaled through context modeling. Depending on the embodiment, in order to reduce data throughput in the image decoding apparatus 200, encoding and decoding of DM candidates may be performed through a bypass model excluding context modeling.

Another example of binarization of DM candidates is shown in Table 4.

TABLE 4

| Chroma mode | Context model 0 | Context model 1 | Context model 2 |
|---|---|---|---|
| DM mode 0 | 1 | | |
| DM mode 1 | 0 | 1 | |
| DM mode 2 | 0 | 0 | 1 |
| DM mode 3 | 0 | 0 | 0 |

As illustrated in Table 4, the first selected (derived) DM candidate may be encoded and decoded into 1 bit and signaled through context modeling, and the second selected DM candidate may be encoded and decoded into 2 bits and signaled through context modeling. The third and fourth selected DM candidates may be encoded and decoded into 3 bits and signaled through context modeling. Depending on the embodiment, in order to reduce data throughput in the image decoding apparatus 200, 1-bit or 3-bit encoding and decoding of DM candidates may be performed through a bypass model excluding context modeling.

Embodiment 3-3

Embodiment 3-3 may correspond to a method of modifying default modes based on a plurality of derived DM candidates. That is, Embodiment 3-3 may correspond to a pruning check method to remove overlap between derived DM candidates and default modes.

The image encoding apparatus 100 and the image decoding apparatus 200 may modify default modes based on whether the default modes overlap with the derived DM modes. That is, the default modes may be modified into different prediction modes based on the order in which the default modes are determined to be the same as the DM candidates.

For example, among the default modes (PLANAR mode, VERTICAL mode, HORIZONTAL mode and DC mode), the default mode that firstly overlaps with DM candidates may be modified to Vertical diagonal mode (intra prediction mode of 66), the default mode that secondly overlaps with the candidates may be modified to Diagonal mode (intra prediction mode of 34), and the default mode that thirdly overlaps with the DM candidates may be modified to intra prediction mode of 2. Additionally, the default mode that fourthly overlaps with DM candidates may be modified to intra prediction mode of 42.

As another example, when PLANAR mode, intra prediction mode of 27, DC mode and intra prediction mode of 30 are derived to be DM candidates, the default mode may be modified to Vertical diagonal mode, VERTICAL mode, HORIZONTAL mode, and Diagonal mode. As another example, when intra prediction mode of 34, intra prediction mode of 36, intra prediction mode of 27, and VERTICAL mode are derived to be DM candidates, the default mode may be modified to PLANAR mode, Vertical diagonal mode, HORIZONTAL mode, and DC mode. A combination of Vertical diagonal mode, Diagonal mode, and intra prediction mode of 2 and intra prediction mode of 42, which are the overlapping replacement modes in the example above, may be replaced with a combination of other modes.

FIG. 21 is a view showing a content streaming system, to which an embodiment of the present disclosure is applicable.

As shown in FIG. 21, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

The embodiments of the present disclosure may be used to encode or decode an image.

What is claimed is:

1. An image decoding method performed by an image decoding apparatus, the image decoding method comprising:
   deriving a plurality of direct mode (DM) candidates for a chroma block;
   determining any one mode of default modes and the plurality of DM candidates for the chroma block based on first information; and
   intra-predicting the chroma block based on the determined mode,
   wherein the default modes are modified based on whether the default modes are the same as the plurality of DM candidates.

2. The image decoding method of claim 1, wherein the default modes are modified to different prediction modes based on the order in which the default modes are determined to be the same as the plurality of DM candidates.

3. The image decoding method of claim 2,
   wherein a first default mode determined to be the same as the plurality of DM candidates is modified to intra prediction mode of 66, and
   wherein a second default mode determined to be the same as the plurality of DM candidates is modified to intra prediction mode of 34.

4. The image decoding method of claim 3, wherein a third default mode determined to be the same as the plurality of DM candidates is modified to intra prediction mode of 2.

5. The image decoding method of claim 4, wherein a fourth default mode determined to be the same as the plurality of DM candidates is modified to intra prediction mode of 42.

6. The image decoding method of claim 1, wherein the plurality of DM candidates are derived from intra prediction modes at different positions within a luma block corresponding to the chroma block.

7. The image decoding method of claim 6, wherein the plurality of DM candidates is derived from the default modes based on the number of DM candidates derived from the intra prediction modes being less than a predetermined number.

8. The image decoding method of claim 7, wherein the number of default modes used to derive the plurality of DM candidates among the default modes is the same as the predetermined number.

9. The image decoding method of claim 6, wherein the plurality of DM candidates are derived from intra prediction modes of different neighboring blocks of the chroma block, based on the number of DM candidates derived from the intra prediction modes being less than a predetermined number.

10. The image decoding method of claim 9, wherein the plurality of DM candidates are derived from the default modes, based on the number of DM candidates derived from the intra prediction modes and intra prediction modes of the neighboring blocks being less than a predetermined number.

11. An image encoding method performed by an image encoding apparatus, the image encoding method comprising:

deriving a plurality of direct mode (DM) candidates for a chroma block;

determining any one mode of default modes and the plurality of DM candidates for the chroma block; and intra-predicting the chroma block based on the determined mode, wherein the default modes are modified based on whether the default modes are the same as the plurality of DM candidates, and wherein first information indicating the determined mode is encoded in a bitstream.

12. A non-transitory computer-readable recording medium storing a bitstream generated by the image encoding method of claim 11.

13. A method of transmitting a bitstream generated by an image encoding method, the image encoding method comprising:

deriving a plurality of direct mode (DM) candidates for a chroma block;

determining any one mode of default modes and the plurality of DM candidates for the chroma block; and intra-predicting the chroma block based on the determined mode, wherein the default modes are modified based on whether the default modes are the same as the plurality of DM candidates, and wherein first information indicating the determined mode is encoded in a bitstream.

* * * * *